March 6, 1962 A. F. TEAGUE 3,023,572

MULTIPLE THRUST PROPELLANT CHARGE

Filed Sept. 22, 1958 3 Sheets-Sheet 1

INVENTOR.
A.F. TEAGUE

BY Hudson and Young

ATTORNEYS

MULTIPLE THRUST PROPELLANT CHARGE

Filed Sept. 22, 1958 3 Sheets-Sheet 2

TYPICAL PRESSURE-TIME CURVE WITH ATTACHED BOOST CHARGE

TYPICAL PRESSURE-TIME CURVE WITH SEPARATED BOOST CHARGE

TYPICAL PRESSURE-TIME CURVE WITH SEPARATED BOOST CHARGE AND HOLES IN SUSTAIN CHARGE

INVENTOR.
A.F. TEAGUE

BY Hudson and Young

ATTORNEYS

MULTIPLE THRUST PROPELLANT CHARGE

Filed Sept. 22, 1958

INVENTOR.
A. F. TEAGUE
BY Hudson and Young
ATTORNEYS

United States Patent Office 3,023,572

Patented Mar. 6, 1962

3,023,572

MULTIPLE THRUST PROPELLANT CHARGE

Abner F. Teague, McGregor, Tex., assignor to Phillips Petroleum Company, a corporation of Delaware Filed Sept. 22, 1958, Ser. No. 762,659
9 Claims. (Cl. 60—35.6)

This invention relates to a multiple thrust propellant charge. In one aspect, this invention relates to a solid propellant charge adapted for use in gas generating devices. In another aspect, this invention relates to a solid propellant charge adapted for use in dual thrust gas generators or dual thrust rocket motors.

Gas generator devices using solid propellants, which when burned, generate large volumes of gas at high pressures can be used for actuating prime movers, starting devices, for propulsion purposes, etc. One type of such a device has been widely used for propelling rockets and other devices. At the present time, motors using a solid propellant as a source of power are being widely used as jet assist take-off units ("JATO" units) during take-offs for heavily-loaded aircraft.

In some types of gas generators or rocket motors, it is advantageous to have two stages of thrust. In gas generators employed to develop large volumes of gas for driving rotating machinery such as turbines and pumps, it is desirable to bring said machinery up to operating speed within a specified time. Thus, two stages of thrust or gas generation can be advantageously employed; a first stage or boost phase to provide a large volume of gas initially so as to overcome the inertia of the machine, and a second stage or sustain phase to maintain generation of gas or thrust for the desired duration. Similarly, in some rocket motors it is advantageous to employ two stages of thrust; the first stage or boost phase being a high thrust phase to boost the missile or rocket rapidly to its flight velocity, and the second stage or sustain phase being of lower thrust to sustain the missile or rocket in flight to its destination.

There are four principal systems for producing the two-stage thrust program. These systems are: (1) single propellant systems wherein the burning area (and thrust) are established by the geometry of the grain, (2) two propellant systems wherein thrust variation is obtained by using two propellants of different burning rates, (3) separate motors whereby one motor giving the boost thrust and the other giving the sustain thrust are employed, (4) variable area exhaust nozzles used alone or in conjunction with single or two-propellant systems.

Employment of the motor systems designated as (3) and (4) above involves considerable mechanical complexity which is undesirable. The system designated (2) above employing two propellants of different burning rates is widely used for producing two-stage thrust programs. One form of this system has been to use a propellant grain, fabricated of two different propellant materials having different burning rates, with the first stage boost phase propellant (high-burning rate) bonded directly to the end of the second stage or sustain phase propellant grain (low-burning rate). Difficulties are frequently encountered with this type of propellant charge. Following the function of the boost phase propellant the combustion chamber pressure drops rapidly, as is evidenced by the high-pressure peaks on the pressure vs. time curve, or the high thrust peaks on the thrust vs. time curve. Although thereafter the pressure builds up rapidly to an operating pressure, this drop in pressure, which is often represented by a "saddle" on the pressure or thrust vs. time curve, is evidence of unsatisfactory ignition. If the pressure drop following the functioning of the boost phase propellant is severe, that is, if the "saddle" is very pronounced, a misfire or hangfire can occur, which phenomena most often occurs at relatively low temperatures, e.g., about —75° F. During functioning of the boost phase propellant, heat losses to the surrounding environment (case wall, insulation, the propellant itself, etc.) also contribute to "saddling."

I have found that improved flame propagation from the first stage or boost phase propellant to the second stage or sustain phase propellant, and an increase in internal pressure during the transition from the boost phase to the sustain phase of operation, can be obtained by elevating or spacing apart said boost phase propellant from said sustain phase propellant. Perforation of the elevated disc or grain of boost phase propellant also aids in improving flame propagation during transition from the boost to the sustain phase of operation. The perforation permits the flame from the burning boost phase propellant to contact small segments of the sustain phase propellant simultaneously with burning of said boost phase propellant because said boost phase propellant burns on both sides.

Thus, broadly speaking, the present invention resides in a propellant charge assembly comprising a grain of first stage or boost phase propellant mounted on and spaced apart from a grain of second stage or sustain phase propellant material.

In a presently preferred embodiment of the invention, the face or end of the second stage or sustain phase propellant adjacent the spaced apart first stage or boost phase propellant is provided with a plurality of recesses. When employing this embodiment of the invention the "saddle" referred to above which normally occurs during the transition from boost phase to sustain phase operation is essentially completely eliminated.

An object of this invention is to provide an improved propellant charge of controlled thrust characteristics. Another object of this invention is to provide an improved dual thrust propellant charge assembly. Another object of this invention is to improve flame propagation between the first stage or boost phase propellant and the second stage or sustain phase propellant in dual thrust operations. Another object of this invention is to improve the interstage transmission of thrust between the first and second stages in dual thrust operations. Still another object of this invention is to provide a rocket motor of varying thrust characteristics. Other aspects, objects, and advantages of the invention will be apparent to those skilled in the art in view of this disclosure.

Figure 1:
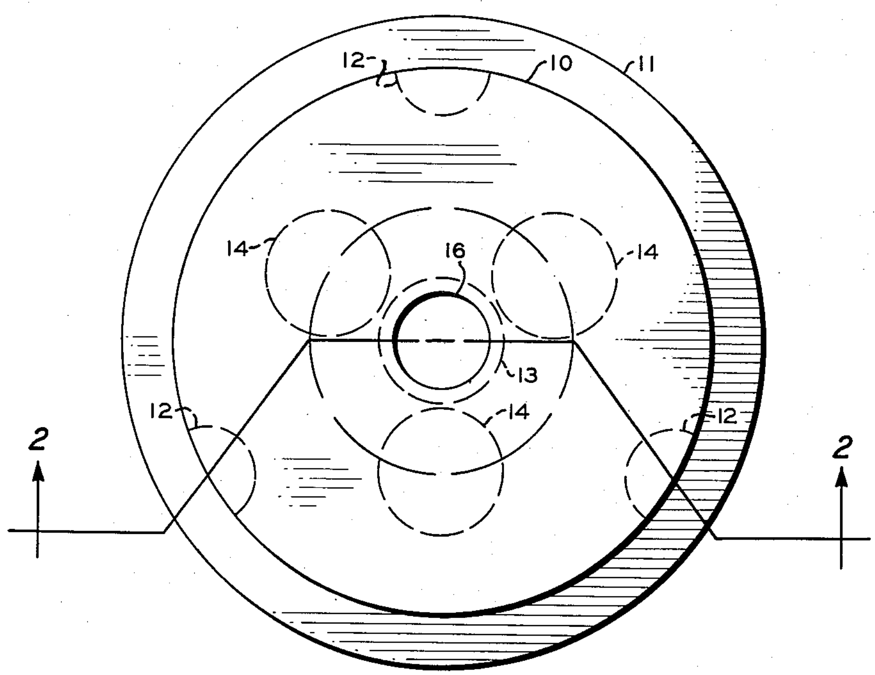
FIGURE 1 is an end view in elevation of a presently preferred embodiment of the propellant charge assembly of the invention.
Figure 2:
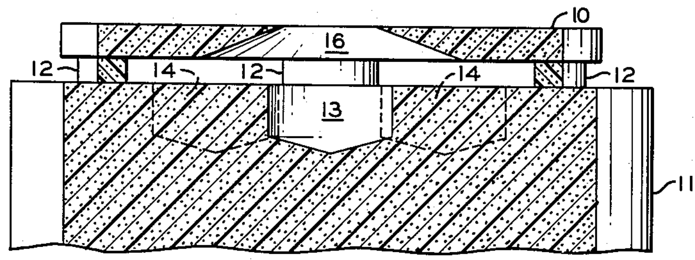
FIGURE 2 is a cross-section taken along the lines 2—2 of FIGURE 1.
Figure 9:
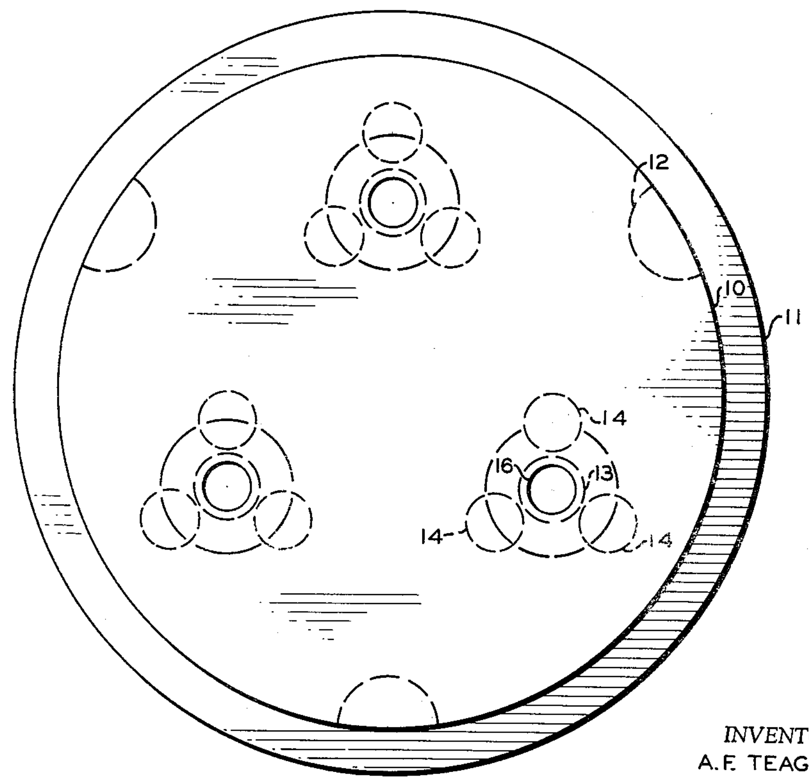
FIGURE 9 is an end view in elevation of another propellant charge assembly in accordance with the invention.

Referring now to the drawings, wherein like reference numerals are employed to denote like elements, the invention will be more fully explained. In FIGURES 1 and 2, there is shown propellant charge assembly comprising a first stage or boost phase propellant grain 10 mounted on and spaced apart from one end or face of a second stage or sustain phase propellant grain 11 by means of support legs 12. Said second stage propellant is a solid cylindrical grain of end burning configuration having an axially disposed recess 13 in one end or face thereof. A plurality of other recesses 14 are also provided in said end of said second stage propellant and are spaced about said axially disposed recess. As here shown, said other recesses 14 are spaced apart equally at intervals of approximately 120°. While this embodiment of the invention is here illustrated with one axially disposed recess 13 surrounded by three other recesses 14 equally spaced thereabout, it is, of course, within the scope of the invention to employ more than one such group of recesses, particularly in larger grains, as is illustrated in FIGURE 9. Other arrangements of said recesses can also be employed.

First stage or boost phase propellant grain 10 is mounted on said second stage or sustain phase propellant grain 11 by means of support legs or wedges 12 made of the same propellant material as said boost phase propellant grain, and which are adhesively bonded to and between said first stage grain 10 and second stage grain 11. Said first stage propellant grain 10 has an axially disposed tapered perforation 16 therein. Said tapered perforation tapers from a relatively small opening in the upper or outer surface to a relatively large opening in the lower or inner surface of said grain 10. In a preferred embodiment of the invention, said tapered perforation is mounted directly over the axially disposed perforation in the second stage grain propellant 11 and the bottom side of the perforation is of such size as to extend over at least a portion of said other recesses 14 in the end of said grain 11. When a plurality of groups of recesses is employed, as illustrated in FIGURE 9, it is preferred that each of the tapered perforations in first stage grain 10 be mounted over a group of recesses 13 and 14 in the second stage grain 11 in the same manner. The provision of tapered perforation 16 permits burning on both the upper and under side of said boost grain 10. The taper on said perforation 16 aids in directing flames from the initial burning of first stage grain 10 into said recesses 13 and 14 on the end of second stage propellant grain 11. It will be understood by those skilled in the art that the distance which first stage grain 10 is elevated above or spaced apart from said second stage propellant grain 11 will depend upon the relative sizes, the burning rates, and the composition of said grains of propellant material.

Figure 3:
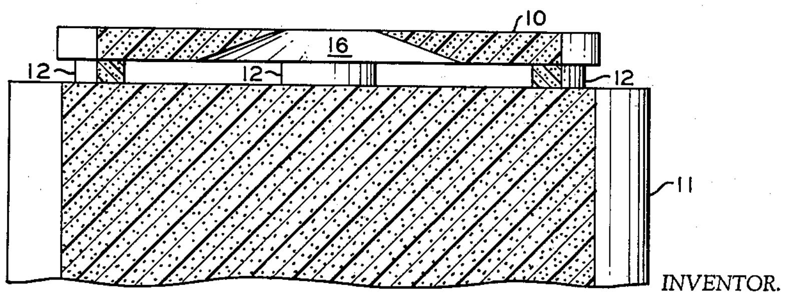
FIGURE 3 is a cross-section, similar to that of FIGURE 2, of another embodiment of the invention wherein the perforations in the face or end of the first stage or sustain phase propellant grain have been omitted.

The modification of the invention illustrated in FIGURE 3 is like that illustrated in FIGURES 1 and 2 except that the recesses 13 and 14 in the end of the second stage propellant grain 11 have been omitted. As will be explained further in connection with FIGURES 5, 6 and 7, this modification of the invention is less preferred than that illustrated in FIGURES 1 and 2. It is to be understood, however, that the modification illustrated in FIGURE 3 is a definite improvement over that of the prior art.

Figure 4:
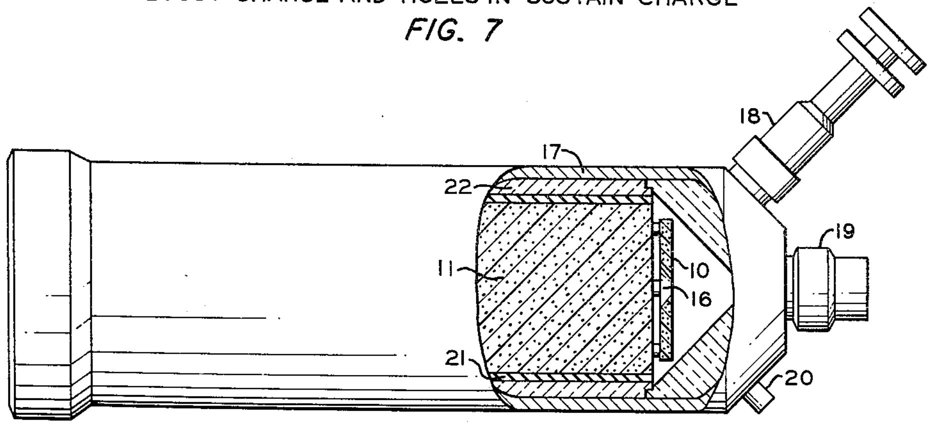
FIGURE 4 is a view, partly in cross-section, illustrating the mounting and use of a propellant charge assembly of the invention in the case of a commercially available gas generator.

FIGURE 4 illustrates the use of a propellant charge assembly of the invention in the case of a gas generator. Said gas generator comprises a case 17 closed at one end and having a gas exit tube 18 leading therefrom at the other end. An igniter 19 is axially mounted in said other end of said case 17. If desired, a pressure tap 20 can also be provided in the end of said case 17. As here shown, said igniter is a screw-in type igniter and extends into case 17 to a point adjacent the first stage propellant grain 10. Any suitable type of igniter device can be employed. The particular type here shown is a McCormick-Selph 1554 Type A igniter. The pyrotechnic material in this igniter is barium nitrate and a zirconium-nickel alloy. Ignition is accomplished by a double bridge wire, connected in parallel, coated with the pyrotechnic material. Any other suitable type of igniters such as an electric squibb as is illustrated in FIGURE 8 can also be employed.

Figure 8:
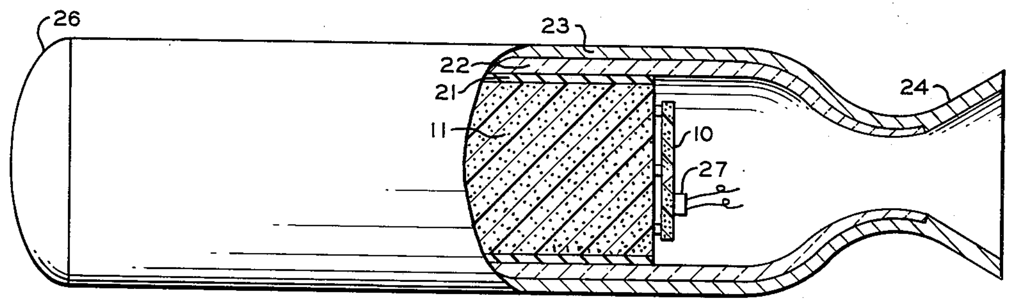
FIGURE 8 is a view, partly in cross-section, illustrating the use of a dual thrust propellant charge assembly of the invention in a rocket motor.

When the propellant charge assembly is employed in a case such as the gas generator case here illustrated or in the rocket motor case of FIGURE 8, the second stage propellant grain 11 is restricted on all surfaces except the end surface adjacent grain 10 with a slow burning restrictor material 21. Said restrictor material can be bonded to grain 11 by means of any suitable adhesive. It is desirable that the wall of case 17 be protected from the heat generated during the burning of a propellant charge assembly. For this purpose, said wall of said case is insulated by means of insulation 22. Any suitable type of insulation can be employed. Formica FF34, a modified fiber glass-phenolic resin, available from the Formica Company, is one example of an insulation material which is suitable for the present use.

FIGURE 8 illustrates the mounting of a propellant charge assembly of the invention in a rocket motor. Said rocket motor comprises a case 23 closed at one end and having an exhaust nozzle 24 attached to the other end thereof. Any type of payload can be carried in or under closure member 26 mounted on the forward end of said rocket motor. The actual mounting and bonding of the propellant charge assembly in and to the inner wall of case 23 can be the same as that described in connection with FIGURE 4 in mounting the propellant charge assembly in the case 17 of the gas generator there shown. An electrical squibb 27 is mounted adjacent first stage propellant grain 10 and is used to ignite same.

In the operation of the devices illustrated in FIGURES 4 and 8, first stage propellant grain 10 is ignited and by means of the perforations 16 therein flames spread through said perforation to the under side of said grain and are directed onto the end or face of second stage propellant grain 11 during the burning of first stage propellant grain 10. Said first stage propellant 10 is of a high burning rate and generates relatively large volumes of gas during the initial period of operation. This large volume of gas, when used in a gas generator as in FIGURE 4, is removed through gas exit tube 18 and passed to the blades of a turbine or other device (not shown) and serves to overcome the inertia of said device and quickly raise the speed of the turbine or other device to the desired operating speed. When the propellant charge assembly is used in a rocket motor as in FIGURE 8, the large initial volume of gas creates a high initial thrust and serves to boost the rocket motor to its flight velocity in a very short space of time. In both devices, the second stage propellant grain 11 is ignited during the burning of the first stage propellant grain 10 and burning of said second stage propellant grain 11 serves to sustain the operation of the device for the desired period of time depending of course upon the size of the unit. Said second stage propellant grain 11 is relatively slower burning than said first stage grain 10 and the volume of gas produced per unit of time is less.

The following examples will serve to further illustrate the invention.

EXAMPLE I

A number of propellant charge assemblies were made up of a second stage or sustain phase propellant grain of end burning solid configuration having a length of 6.6 inches and an outside diameter of 2.55 inches; and a first or boost phase propellant grain or disc having an outside diameter of 2.55 inches, and a thickness of 0.12 inch, adhesively bonded to one end of said first stage grain of propellant material with adhesive No. 1 given in Table IV hereinafter. Said second stage grain of propellant material was restricted on all surfaces, except the end thereof to which said first stage grain of propellant was bonded, with a restrictor material like that given in Table III hereinafter.

Figure 5:
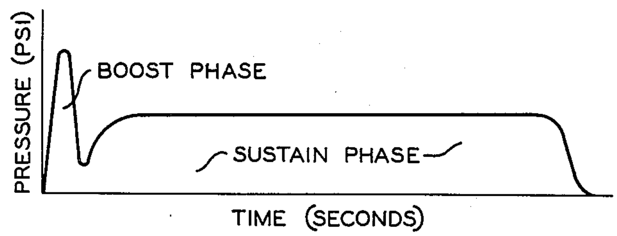
FIGURE 5 is a typical pressure vs. time curve obtained with a dual thrust propellant charge assembly of the prior art.

Each completed assembly was mounted in the case of a gas generator like that illustrated in FIGURE 4 and then fired. When these assemblies were fired the second stage propellant either failed to ignite or there was produced a pressure vs. time curve having a pronounced "saddle." FIGURE 5 is a typical pressure vs. time curve obtained with this type of propellant charge assembly wherein the first stage propellant grain is adhesively bonded directly to the end of the second stage propellant grain. The pronounced "saddle" between the boost phase and the sustain phase of operation is to be particularly noted.

EXAMPLE II

Figure 6:
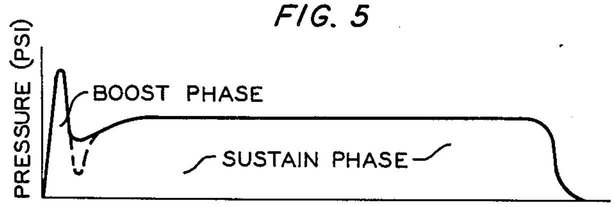
FIGURE 6 is a typical pressure vs. time curve obtained by burning one embodiment of the propellant charge assembly of the invention.

A number of propellant charge assemblies were made up in accordance with the invention and having a configuration like that illustrated in FIGURE 3. The disc of first stage or boost propellant had an O.D. of from 2.1 to 2.3 inches and was 0.12 inch thick. Said first stage grain had an axial perforation therein which tapered from a diameter of 0.38 inch on the top surface to a diameter of 1.0 inches on the bottom surface. Said disc was elevated approximately 0.1 inch from the end of the second stage propellant grain. As explained previously this elevation of the first stage or boost phase grain permits burning on both the top and bottom side of said grain and at the same time directs flames onto the end surface of the second stage grain. Each of said propellant charge assemblies was mounted in a gas generator case like that illustrated in FIGURE 4. When this configuration or embodiment of the invention was employed, the second stage propellant ignited in all instances. FIGURE 6 is a typical pressure vs. time curve obtained from firing this configuration of the propellant grain assembly of the invention. It is to be noted that the "sadle" between the boost phase and the sustain phase has been markedly reduced in depth. For convenience, the dotted line shown represents the depth of the "saddle" obtained in the pressure vs. time curve of FIGURE 5 and affords a ready comparison to show the improvement afforded by elevating or spacing apart the first stage propellant grain from the second stage propellant grain.

EXAMPLE III

A number of other propellant charge assemblies were prepared like those prepared in Example II except that the end or face of the second stage grain of propellant material adjacent the first stage grain of propellant material was provided with an axial perforation of from 0.4 to 0.5 inch in diameter and about 0.2 inch deep directly below the axial perforation in the first stage propellant disc. Three other recesses spaced apart around said axial perforation on either a 1 inch diameter circle or a 1.34 inch diameter circle were also provided in said end of said second stage propellant. This configuration of the propellant charge is illustrated in FIGURES 1 and 2.

Figure 7:
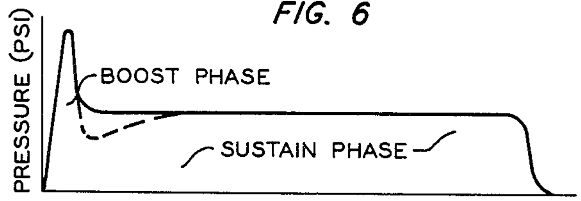
FIGURE 7 is a typical pressure vs. time curve obtained by burning a presently preferred embodiment of the dual thrust propellant charge assembly of the invention.

When the propellant charge assemblies having said configuration were fired in a gas generator device like that illustrated in FIGURE 4, the pressure vs. time curve obtained was completely satisfactory. FIGURE 7 is a typical pressure vs. time curve obtained from said firings. It is to be noted that the "saddle" between the boost phase and the sustain phase has been completely eliminated. The dotted lines shown afford a comparison between the "saddle" obtained in FIGURE 6 and shows the improvement in operation obtained when the recesses are provided in the face of the second stage propellant grain.

Any suitable solid propellant composition can be used in fabricating the propellant charge assembly of the invention.

The propellant material utilized in fabricating the propellant charges used in the gas generators or rocket motors of this invention can be prepared from a variety of known compounding materials. Particularly useful propellant compositions which may be utilized in the practice of this invention are of the rubbery copolymer-oxidizer composite type which are plasticized and worked to prepare an extrudable mass at 130° to 175° F. The copolymer can be reinforced with suitable reinforcing agents such as carbon black, silica, phenol-formaldehyde resins, urea-formaldehyde resins, melamine-formaldehyde resins, and the like. Suitable oxidizers include the alkali metal, alkaline earth metal, and ammonium salts of nitric, and perchloric acids, such as ammonium nitrate and ammonium perchlorate. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst. The resulting mixture is heated to effect curing of the same.

Solid propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

Composite solid propellant compositions of the types preferred in this invention and found to be of particular value in actual practice are those disclosed and claimed in copending applications, Serial No. 284,447, filed April 25, 1952 by W. B. Reynolds et al.; Serial No. 561,943, filed January 27, 1956 by W. B. Reynolds et al.; and Serial No. 753,160, filed August 4, 1958 by O. D. Ratliff et al. The propellant compositions of these copending applications comprise a rubbery polymer of a heterocyclic nitrogen base compound with a conjugated diene, mixed with a solid oxidizer.

The copolymers utilized as binders in the propellant compositions of said copending applications are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen base compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl groups are also applicable.

In the preparation of the copolymers, the amount of conjugated diene employed is in the range between 75 and 95 parts by weight per 100 parts of copolymer and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of copolymer. Masterbatching refers to the method of adding carbon black to the latex before coagulation and coagulating to form a high degree of dispersion of the carbon black in the copolymer. In order to facilitate dispersion of the carbon black in the latex, Marasperse-CB, or similar surface active agent, is added to the carbon black slurry or to the water used to prepare the slurry.

The following empirical formulation or recipe represents generally the class of propellant compositions disclosed in said copending applications which are preferred for the preparation of the propellant grains of this invention.

*Table I*

| Ingredient | Parts per 100 parts of rubber | Parts by weight |
|---|---|---|
| Binder | | 10–25 |
| Copolymer (Bd/MVP) | 100 | |
| Reinforcing agent | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidizer (ammonium nitrate or perchlorate) | | 75–90 |
| Burning rate catalyst | | 0–30 |

Suitable plasticizers useful in preparing these propellant grains include TP-90-B [di-(butoxy ethoxy ethoxy)methane] supplied by Thiokol Corporation; benzophenone; Butarez (liquid polybutadiene); Philrich 5 (a highly aromatic oil); TP-90-B (dibutoxyethoxy formal); ZP-211 (same as TP-90-B with low boiling materials removed); and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable anti-oxidant is Flexamine, a physical mixture containing 65 percent of a complex diarylamine-ketone reaction product and 35 percent of N,N'-diphenyl-p-phenylenediamine, supplied by Naugatuck Chemical Corporation. A suitable wetting agent is Aerosol-OT (dioctyl sodium sulfosuccinate), supplied by American Cyanamide Company. Satisfactory rubber cure accelerators include Philcure 113 (SA-113, N,N-dimethyl-S-tertiary butylsulfenyl dithiocarbamate); Butyl-8 (a dithiocarbamate-type rubber accelerator), supplied by R. T. Vanderbilt Company; and GMF (quinone dioxime), supplied by Naugatuck Chemical Company. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, copper chromite and the like, can also be used.

Specific examples of propellant compositions formulated in accordance with the above disclosure are given in Table II below:

*Table II*

PROPELLANT FORMULATIONS

| | Boost phase propellant, weight percent | Sustain phase propellant, weight percent |
|---|---|---|
| Composition, ingredient: | | |
| Bd/MVP (90:10) | 4.49 | 12.10 |
| Carbon Black | 1.02 | 2.68 |
| Flexamine | | 0.37 |
| Butarez 25 [a] | 4.49 | |
| ZP-211 | | 2.41 |
| Milori Blue | | 1.95 |
| Magnesium Oxide | | 0.49 |
| Ammonium Nitrate | 77.00 | 80.00 |
| Ammonium Perchlorate | 10.00 | |
| Ammonium Dichromate | 2.00 | |
| Ammonium Oxalate | 1.00 | |
| | 100.00 | 100.00 |
| Ballistic properties: | | |
| Flame Temperature, ° F | 3,339 | 2,200 |
| Specific Impulse-lb.-sec./lb | 217 | 184 |
| Burning Rate-in./sec | 0.31 | 0.08 |

[a] A liquid polybutadiene prepared by sodium catalyzed polymerization in heptane and having a Saybolt furol viscosity at 100° F. of approximately 2,500 seconds. Further details regarding the preparation of Butarez 25 and other suitable liquid polybutadienes can be found in Patent 2,631,175, issued March 10, 1953, to W. W. Crouch.

The restrictor material applied to the propellant grains can be made from any of the materials used for this purpose in the rocket art. An example of a suitable restrictor material is given in Table III below:

*Table III*

RESTRICTOR FORMULATION

| Ingredient | Weight percent |
|---|---|
| GR-S 1505 | 69.08 |
| Philblack A (a furnace black) | 24.18 |
| Flexamine | 1.04 |
| Wood rosin | 3.45 |
| Sulfur | 0.18 |
| Stearic acid | 0.69 |
| Zinc oxide | 0.69 |
| Butyl eight | 0.69 |
| | 100.00 |

The adhesive employed in bonding the first stage or boost phase propellant grain to the second stage or sustain phase propellant grain can be any adhesive suitable for the purpose. Specific examples of suitable adhesive formulations are given in Table IV below. The adhesive can be a "loaded" adhesive such as No. 1 in Table IV and can contain an oxidizer which increases the burning rate thereof or, preferably, it can be a material such as No. 2 given in Table IV which does not contain an oxidizer. Likewise, any suitable adhesive can be employed for bonding the insulation and grain in the motor case.

*Table IV*

ADHESIVE FORMULATIONS

No. 1

| Ingredient | Weight percent | Parts by weight |
|---|---|---|
| Methyl ethyl ketone | 85.00 | |
| Paracril D [a] | 7.39 | |
| Flexamine | 0.22 | |
| Schenectady resin SP 6601 [b] | 7.39 | |
| | 100.00 | 45 |
| Amonium perchlorate | | 50 |
| Powdered aluminum | | 5 |
| | | 100 |

No. 2

| Ingredient | Weight percent | Parts by weight |
|---|---|---|
| Castor oil | 43.4 | |
| Propylene glycol | 21.7 | |
| Hylene T.M. [c] | 26.2 | |
| MHETHPEDA [d] | 8.7 | |
| | 100.0 | |

[a] An acrylonitrile-butadiene copolymer.
[b] An uncured phenol-formaldehyde resin.
[c] Mixed isomers of toluene diiocyanate.
[d] Monohydroxyethyltrihydroxypropylethylenediamine.

While the invention has been described in terms of a propellant charge assembly wherein the first stage propellant material is a relatively fast burning rate material and the second stage propellant material is a relatively slow burning rate material, the invention is not thus limited. It is within the scope of the invention for said first stage propellant material to have a relatively slow burning rate and said second stage propellant material to have a relatively fast burning rate. It is understood that said burning rates are relative to each other.

Variations and modifications of the invention can be made by those skilled in the art without departing from the scope or spirit thereof, and it is to be understood that all matter herein set forth in the discussion and drawings is merely illustrative and does not unduly limit the invention.

I claim:

1. A propellant charge assembly comprising: a grain of second stage propellant material; a perforated grain of first stage propellant material mounted on and spaced apart from one end of said grain of second stage propellant material; and a plurality of legs of first stage propellant material adhesively bonded to and between said grain of first stage propellant material and said grain of second stage propellant material for mounting said grain of first stage propellant material on said end of said grain of second stage propellant material.

2. A dual thrust propellant charge assembly, suitable for use in a gas generator device, which comprises: a grain of second stage propellant material having a plurality of recesses formed in one end thereof; a perforated grain of first stage propellant material mounted on and spaced apart from said one end of said second stage propellant material, at least one perforation in said first stage propellant material being axially aligned with at least one of said recesses in said second stage propellant material; and a plurality of legs of first stage propellant material bonded to and between said grain of first stage propellant material and said grain of second stage propellant material for mounting said grain of first stage propellant material on said end of said second stage propellant material.

3. A dual thrust propellant charge assembly, suitable for use in a gas generator device, which comprises: a cylindrical grain of second stage propellant material; a first axially disposed recess provided in one end of said grain of second stage propellant material; a plurality of other recesses provided in said end of said grain of second stage propellant material; a grain of first stage propellant material, having an axial perforation therein, mounted on and spaced apart from said end of said grain of second stage propellant material, said perforation being axially aligned with said axial recess in said grain of second stage propellant material; and a plurality of legs of first stage propellant material bonded to and between said grain of first stage propellant material and said grain of second stage propellant material for mounting said grain of first stage propellant material on said end of said grain of second stage propellant material.

4. The propellant charge assembly of claim 3 wherein: said other recesses in said grain of second stage propellant material are equally spaced about said axial recess; said axial perforation in said grain of first stage propellant is tapered and said legs of first stage propellant material are alternately positioned between said other recesses in said grain of second stage propellant material.

5. A propellant charge assembly, suitable for use in a gas generator device, which comprises: a grain of second stage propellant material having a plurality of recesses provided in one end thereof, said recesses being arranged in a plurality of groups; a grain of first stage propellant material having a plurality of perforations therein mounted on and spaced apart from said end of said grain of second stage propellant material, one each of said perforations being disposed opposite one each of said groups of recesses; and a plurality of legs of first stage propellant material bonded to and between said grain of first stage propellant and said grain of second stage propellant material for mounting said grain of first stage propellant material on said grain of second stage propellant material.

6. A gas generator device comprising: a case having one end thereof closed; igniter means and gas exit means positioned in the other end of said case; a propellant charge assembly mounted in said case, said propellant charge assembly comprising: a grain of second stage propellant material; a perforated grain of first stage propellant material mounted on and spaced apart from one end of said grain of second stage propellant material; and a plurality of legs of first stage propellant material bonded to and between said grain of first stage propellant and said grain of second stage propellant material for mounting said grain of first stage propellant material on said grain of second stage propellant material.

7. A gas generator device comprising: a case having one end thereof closed; igniter means and gas exit means positioned in the other end of said case; a dual thrust propellant charge assembly mounted in said case, said propellant charge assembly comprising: a cylindrical grain of second stage propellant material; a first axially disposed recess provided in the end of said grain of second stage propellant material which is adjacent said igniter means; a plurality of other recesses provided in said end of said grain of second stage propellant material and disposed around said first axial recess; an axially perforated grain of first stage propellant material mounted on and spaced apart from said end of said second stage propellant material; and a plurality of legs of first stage propellant material adhesively bonded to and between said grain of first stage propellant material and said grain of second stage propellant material for mounting said grain of first stage propellant material on said grain of second stage propellant material.

8. A rocket motor comprising: a case having one end thereof closed; an exhaust nozzle axially mounted in the other end of said case; a dual thrust propellant charge assembly mounted in said case with one end adjacent said exhaust nozzle, said propellant charge assembly comprising: a grain of second stage propellant material; a perforated grain of first stage propellant material mounted on and spaced apart from one end of said grain of second stage propellant material; and a plurality of legs of first stage propellant material bonded to and between said grain of first stage propellant and said grain of second stage propellant material for mounting said grain of first stage propellant material on said grain of second stage propellant material.

9. A rocket motor comprising: a case having one end thereof closed; an exhaust nozzle axially mounted in the other end of said case; a dual thrust propellant charge assembly mounted in said case with one end adjacent said exhaust nozzle, said propellant charge assembly comprising: a cylindrical grain of second stage propellant material; a first axially disposed recess provided in the end of said grain of second stage propellant material which is adjacent said exhaust nozzle; a plurality of other recesses provided in said end of said grain of second stage propellant material and disposed around said first axial recess; an axially perforated grain of first stage propellant material mounted on and spaced apart from said end of said second stage propellant material; a plurality of legs of first stage propellant material adhesively bonded to and between said grain of first stage propellant material and said grain of second stage propellant material for mounting said grain of first stage propellant material on said grain of second stage propellant material; and igniter means for igniting said grain of first stage propellant material.

References Cited in the file of this patent

UNITED STATES PATENTS 2,390,635 Barker et al. ____________ Dec. 11, 1945

FOREIGN PATENTS 659,758 Great Britain ___________ Oct. 24, 1951